(12) United States Patent
Lee et al.

(10) Patent No.: US 12,007,598 B1
(45) Date of Patent: Jun. 11, 2024

(54) BUTTON LIGHTING MODULE AND BUTTON APPARATUS HAVING THE SAME

(71) Applicant: KORTEK CORPORATION, Incheon (KR)

(72) Inventors: Joong Won Lee, Incheon (KR); Ho Jun Kwak, Siheung-si (KR); Hyun Woo Lee, Incheon (KR); Tae Jung Yoon, Bucheon-si (KR); Chan Hwan Kim, Incheon (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 18/200,021

(22) Filed: May 22, 2023

(30) Foreign Application Priority Data

Nov. 18, 2022 (KR) .......................... 10-2022-0155629

(51) Int. Cl.
*F21V 8/00* (2006.01)
(52) U.S. Cl.
CPC ......... *G02B 6/0045* (2013.01); *G02B 6/0031* (2013.01); *G02B 6/0073* (2013.01)
(58) Field of Classification Search
CPC ... G02B 6/0045; G02B 6/0031; G02B 6/0073
See application file for complete search history.

(56) References Cited

U.S. PATENT DOCUMENTS

| | | | | |
|---|---|---|---|---|
| 7,239,303 | B2 * | 7/2007 | Liao | H01H 3/125 |
| | | | | 345/168 |
| 9,117,603 | B2 * | 8/2015 | Hwa | H01H 13/83 |
| 9,910,211 | B2 * | 3/2018 | Kloeppel | G02B 6/0055 |
| 10,276,327 | B2 * | 4/2019 | Chen | H01H 3/122 |
| 11,360,258 | B1 * | 6/2022 | Huwe | G02B 6/0068 |
| 11,543,585 | B2 * | 1/2023 | Shimokawa | G02B 6/0078 |
| 2013/0126324 | A1 * | 5/2013 | Chiang | H01H 13/7073 |
| | | | | 200/5 A |

FOREIGN PATENT DOCUMENTS

KR   10-1162765 B1   7/2012

* cited by examiner

*Primary Examiner* — Arman B Fallahkhair
(74) *Attorney, Agent, or Firm* — Schmeiser, Olsen & Watts, LLP (57) ABSTRACT

A button lighting module is provided including: a light guide plate which has a button through-hole formed in a thickness direction to allow a button device configured to input a command to pass therethrough and has a light refractor provided around the button through-hole to refract a light path upward; and a light source which is configured to radiate light so that the light is incident on the light guide plate through an outer peripheral side surface of the light guide plate.

10 Claims, 6 Drawing Sheets

BUTTON LIGHTING MODULE AND BUTTON APPARATUS HAVING THE SAME

CROSS-REFERENCE TO RELATED APPLICATION

This application claims the benefit of priority under 35 USC § 119(a) to Korean Patent Applications No. 10-2022-0155629, filed on Nov. 18, 2022, the entire disclosure of which is incorporated herein by reference for all purposes.

FIELD OF TECHNOLOGY

The following relates to a button lighting module for illuminating a button device, configured to promptly input a command to an electronic device such as a game machine, around the button device and a button apparatus having the button lighting module.

BACKGROUND

A button device configured to be pressed with a finger to input a command so that a user's command can be promptly and easily input is installed in an electronic device such as an arcade game machine and a slot machine. However, there are no means for increasing visual stimulation, such as the button device glowing or light sequentially flickering therefrom, when a special event occurs such as when the button device is pressed, or a specific screen is displayed on a display panel in front of the button device. Thus, the effects of stimulating curiosity of the user and viewers around the user and inspiring joy are insufficient.

The related art is disclosed in Korean Patent Registration No. 10-1162765 (Date of Registration: Jun. 28, 2012, Title of Disclosure: Button apparatus for slot machine).

SUMMARY

An aspect relates to a button lighting module for radiating light in a horizontal direction to illuminate a perimeter of a button device and a button apparatus having the button lighting module. Embodiments of the invention are directed to providing a button lighting module having a small vertical height to prevent a vertical height of a button deck from becoming thick and a button apparatus having the button lighting module.

Embodiments of the invention provide a button lighting module including: a light guide plate which has a button through-hole formed in a thickness direction to allow a button device configured to input a command to pass therethrough and has a light refractor provided around the button through-hole to refract a light path upward; and a light source which is configured to radiate light so that the light is incident on the light guide plate through an outer peripheral side surface of the light guide plate.

The light source may include: a plurality of light emitting diode (LED) packages configured to radiate light to the outer peripheral side surface of the light guide plate; and a LED circuit board configured to energizingly support the plurality of LED packages.

Among the plurality of LED packages, one group of an LED package and the other group of an LED package not included in the one group may be disposed to face each other with the button through-hole disposed therebetween, and the LED circuit board may include a first LED circuit board configured to support the one group of the LED package and a second LED circuit board configured to support the other group of the LED package.

The button lighting module of embodiments of the invention may further include a diffuser sheet disposed on an upper side of the light guide plate to overlap with the light refractor.

The button lighting module of embodiments of the invention may further include a lower reflector sheet disposed on a lower side of the light guide plate to overlap with a lower side surface of the light guide plate to reflect light heading toward the lower side of the light guide plate.

The button lighting module of embodiments of the invention may further include an upper reflector sheet disposed on the upper side of the light guide plate to overlap with an upper side surface of the light guide plate to reflect light heading toward the upper side of the light guide plate while not reflecting light heading toward the upper side of the light guide plate through the light refractor. The light refractor may include a groove formed to be open toward the lower side surface of the light guide plate and be recessed in the thickness direction of the light guide plate.

The light refractor may extend along a closed curve path around the button through-hole. Embodiments of the invention provide a button apparatus including: a button lighting module including a light guide plate which has a button through-hole formed in a thickness direction and a light refractor provided around the button through-hole to refract a light path upward and a light source which is configured to radiate light so that the light is incident on the light guide plate through an outer peripheral side surface of the light guide plate; and a button device which has a push button configured to input a command upon being pressed and which is configured to pass through the button through-hole.

The button apparatus of embodiments of the invention may further include a touchscreen panel disposed on a lower side of the light guide plate to support the button device while in contact therewith and electrically detect the push button being pressed.

The push button may have a central portion configured to transmit light, and an image displayed on the touchscreen panel may pass through the button through-hole and be exposed through the central portion.

BRIEF DESCRIPTION OF THE DRAWINGS

Some of the embodiments will be described in detail, with reference to the following figures, wherein like designations denote like members, wherein.

DETAILED DESCRIPTION

Hereinafter, a button lighting module and a button apparatus having the same according to an embodiment of the invention will be described in detail with reference to the accompanying drawings. Terminologies used herein are those used to appropriately describe exemplary embodiments of the invention and may be changed according to an intention of a user or an operator or customary practice in the conventional art to which embodiments of the invention pertain. Therefore, the terminologies should be defined based on the content throughout this specification.

Figure 1:
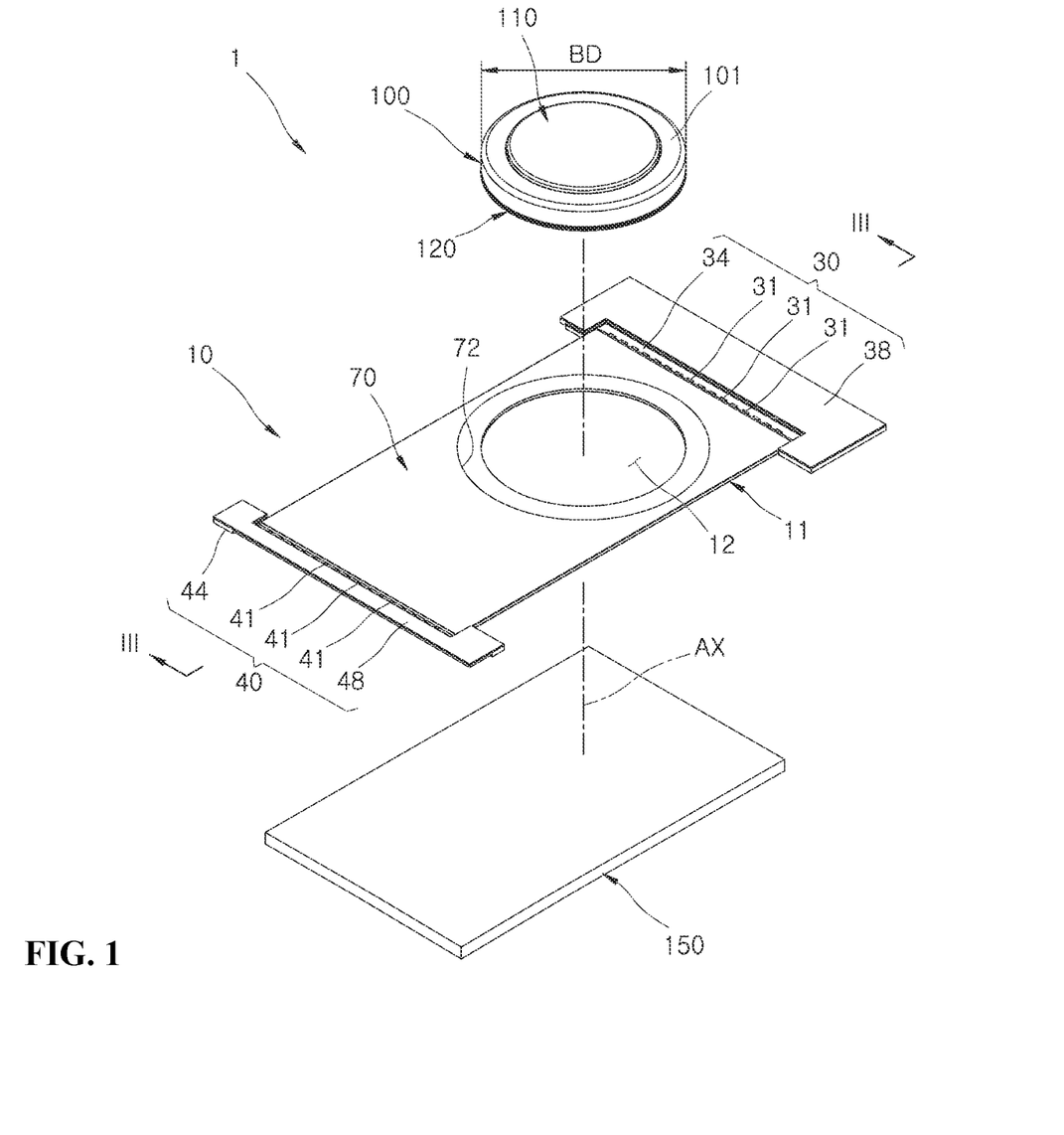
FIG. 1 is an exploded perspective view of a button apparatus according to one embodiment of the invention.
Figure 2:
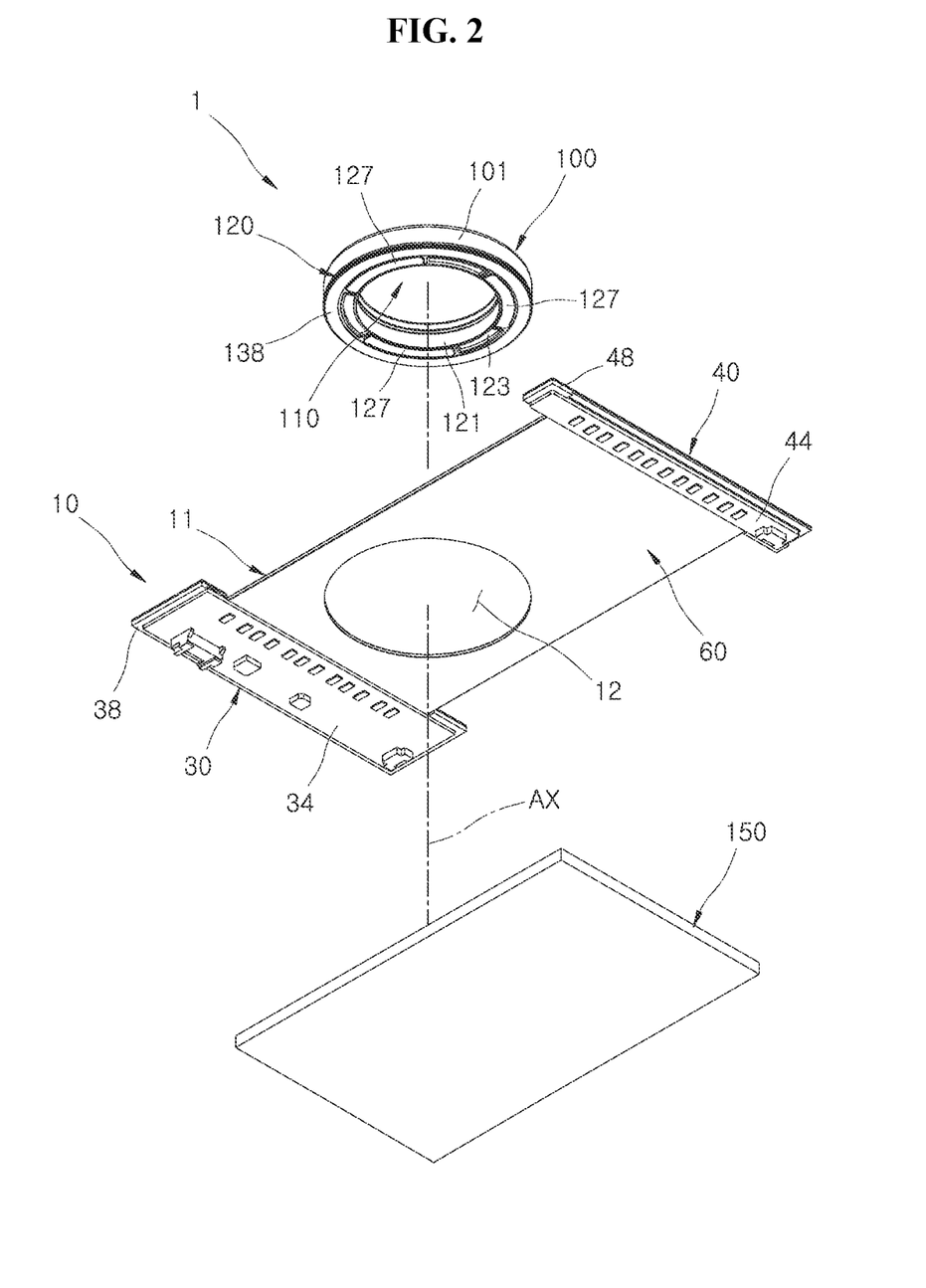
FIG. 2 is a bottom exploded perspective view of the button apparatus according to one embodiment of the invention.
Figure 3:
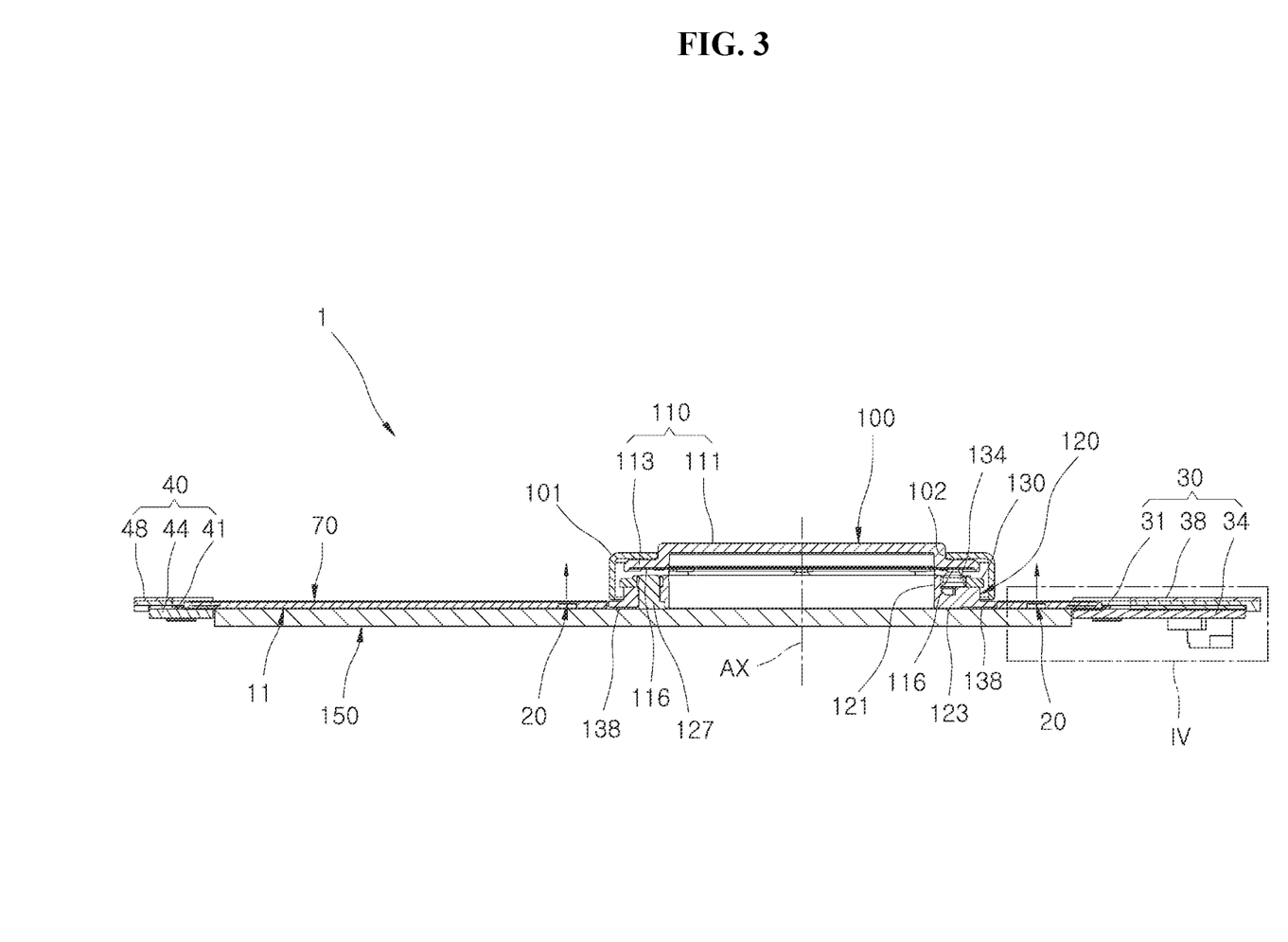
FIG. 3 is a cross-sectional view of a state in which the button apparatus of FIG. 1 is assembled that is taken along line of FIG. 1.
Figure 4:
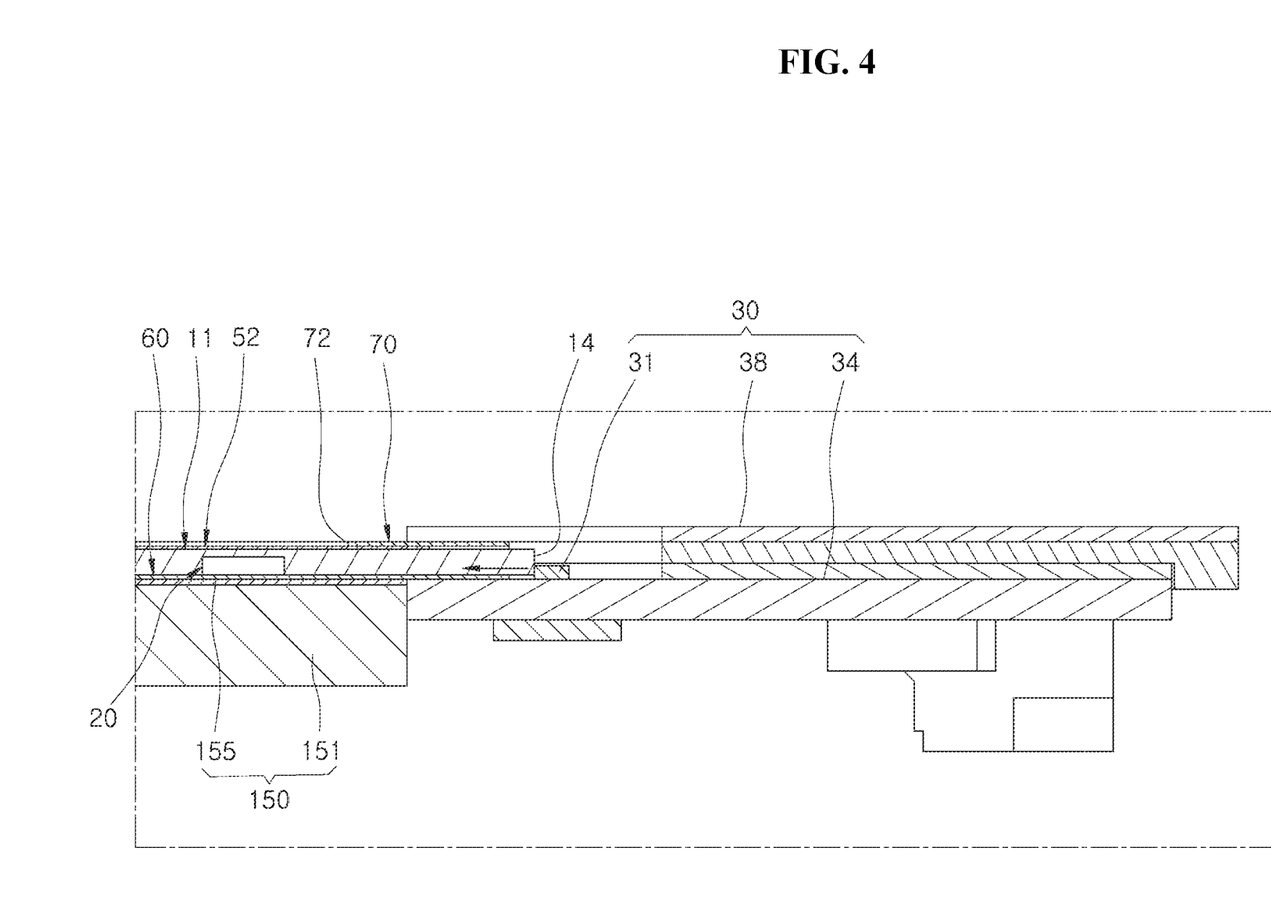
FIG. 4 is an enlarged view of portion IV of FIG. 3.
Figure 5:
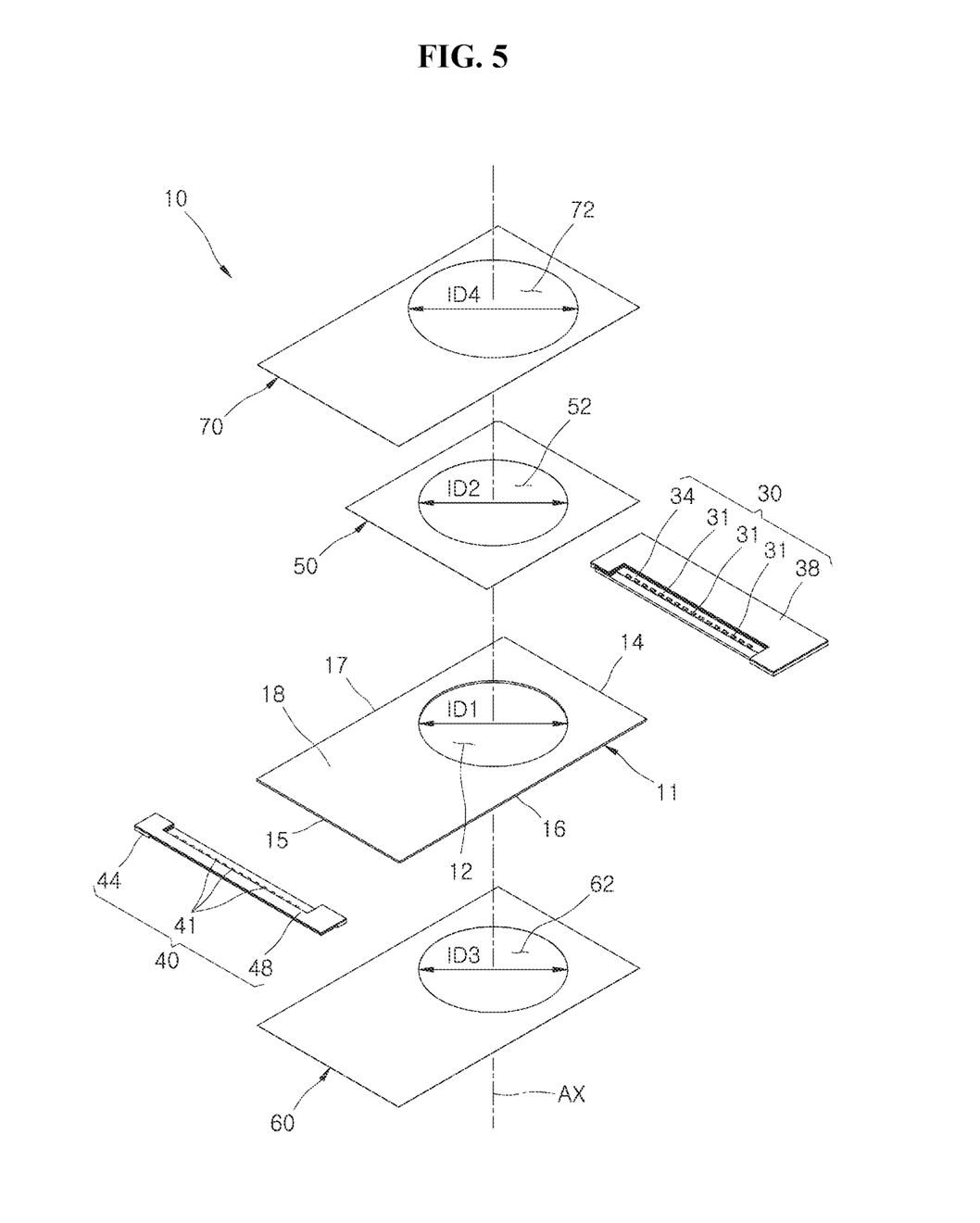
FIG. 5 is an exploded perspective view of a button lighting module according to one embodiment of the invention.
Figure 6:
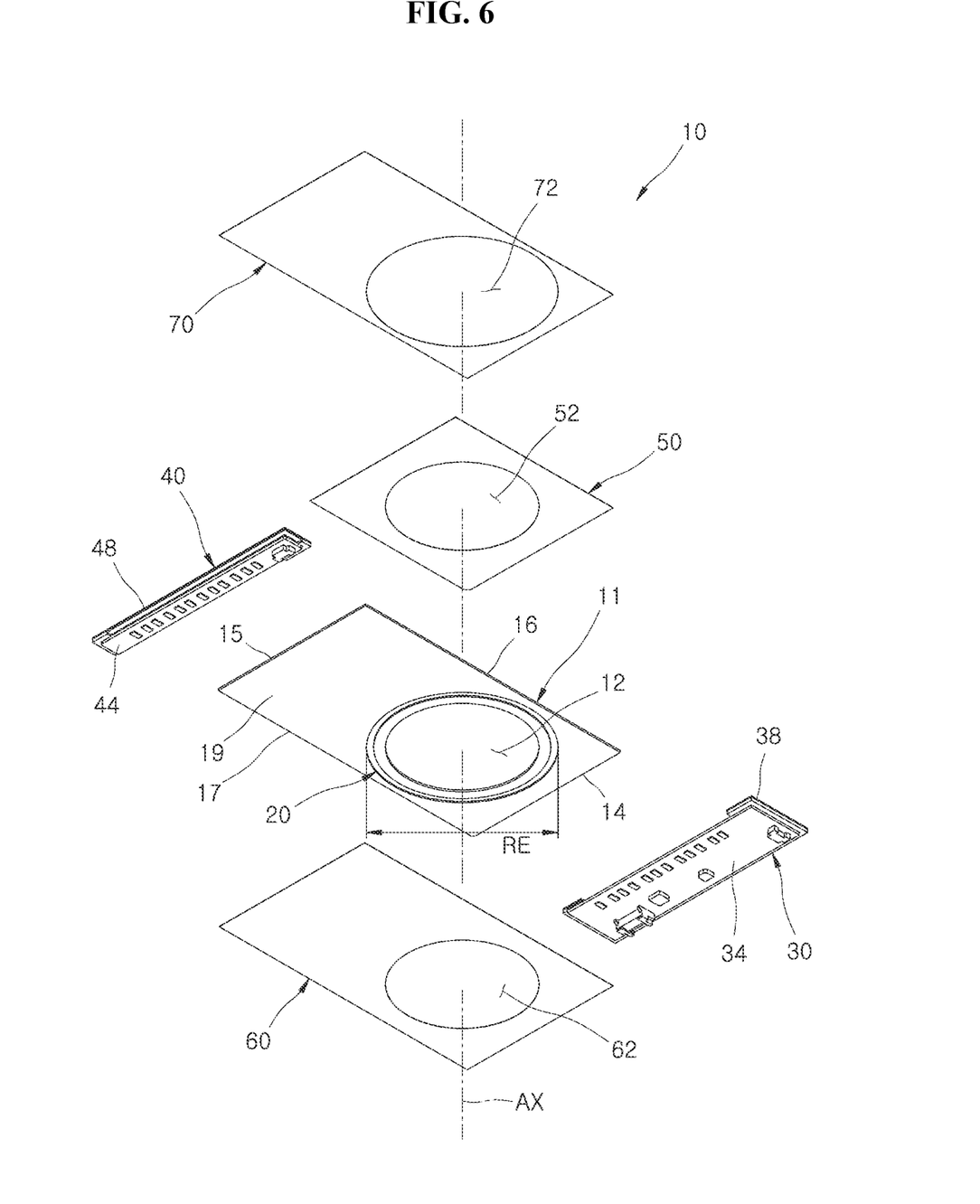
FIG. 6 is a bottom exploded perspective view of the button lighting module according to one embodiment of the invention.

FIG. 1 is an exploded perspective view of a button apparatus according to one embodiment of the invention, FIG. 2 is a bottom exploded perspective view of the button apparatus according to one embodiment of the invention, FIG. 3 is a cross-sectional view of a state in which the button apparatus of FIG. 1 is assembled that is taken along line of FIG. 1, FIG. 4 is an enlarged view of portion IV of FIG. 3, FIG. 5 is an exploded perspective view of a button lighting module according to one embodiment of the invention, and FIG. 6 is a bottom exploded perspective view of the button lighting module according to one embodiment of the invention.

Referring to FIGS. 1 to 6, a button apparatus 1 according to one embodiment of the invention is installed to be pressed by hand to promptly and easily input a user's command to an electronic device such as an arcade game machine and a slot machine.

The button apparatus 1 may include a button device 100, a touchscreen panel 150, and a button lighting module 10.

The touchscreen panel 150 may include a display panel 151 and a touch sensing film 155.

The display panel 151 is a panel on which a still image or a moving image is displayed, and examples of the display panel 151 may include a liquid crystal display (LCD) and an active-matrix organic light-emitting diode (AMOLED) display.

The touch sensing film 155 is configured to, when a user touches a specific spot, sense the touch and is installed on the display panel 151 to overlap therewith. The touch sensing film is a capacitance type touch sensing film and may include a plurality of first touch sensing electrodes (not illustrated) extending in a horizontal direction to be spaced apart from each other and a plurality of second touch sensing electrodes (not illustrated) extending in a vertical direction to be spaced apart from each other. The first and second touch sensing electrodes may be formed of transparent indium tin oxide (ITO).

The touchscreen panel 150 may include, in place of the touch sensing film 155, a touch sensing panel that is thicker than the touch sensing film 155 and is not bendable. Although not illustrated in the drawings, the touchscreen panel 150 may further include protective glass installed on the touch sensing film 155 to overlap therewith.

The button device 100 may include a button base 120, a plurality of through-base electric conductors 127, a push button 110, a button bezel 101, an elastic member holder 130, a plurality of elastic members 134, a push button fixing electric conductor 116, and a double-sided adhesive tape 138. The button base 120 is adhered and fixed to a surface of the touchscreen panel 150, specifically, an upper side surface of the touch sensing film 155, or an upper side surface of the protective glass in a case in which the protective glass is stacked on the touch sensing film 155. The button base 120 is detachably attached to the touchscreen panel 150 using the double-sided adhesive tape 138 in the embodiment of the invention, but the button base 120 may be attached to the touchscreen panel 150 using other means such as an adhesive. The button base 120 is a substantially ring-shaped member having a hollow 121 formed therein.

The plurality of through-base electric conductors 127 are disposed to pass through an outer portion of the hollow of the button base 120 and the elastic member holder 130 in the vertical direction and be spaced apart from each other. The through-base electric conductors 127 may be formed of a material containing a base material made of a metal material or a synthetic resin and metal powder evenly distributed on the base material.

The push button 110 may be disposed to overlap with the button base 120 and be able to move upward and downward relative to the button base 120.

The push button 110 may include a central portion 111 which is positioned to be vertically aligned with the hollow 121 of the button base 120 and configured to transmit light and a flange portion 113 which is stepped from an outer boundary of the central portion 111 and expands outward. An image displayed on the display panel 151 of the touchscreen panel 150 is exposed through the central portion 111 configured to transmit light. In other words, the image displayed on the display panel 151 is shown to the user through the central portion 111.

The button bezel 101 may be a ring-shaped member having a hollow 102 formed therein to correspond to the central portion 111 of the push button 110 so that the central portion 111 is exposed. The button bezel 101 covers the push button 110 so that the central portion 111 of the push button 110 is exposed and the flange portion 113 is hidden. The button bezel 101 is detachably coupled to the button base 120.

The plurality of elastic members 134 elastically press the push button 110 so that the push button 110 is biased upward. For example, the plurality of elastic members 134 may be formed of a rubber material or include a coil spring. The plurality of elastic members 134 come in contact with a lower side surface of the flange portion 113 of the push button 110 and elastically support the push button 110.

The elastic member holder 130 is a ring-shaped member and is vertically aligned with the button base 120 and mounted on the button base 120. A plurality of elastic member seating through-holes or elastic member seating grooves into which the plurality of elastic members 134 are inserted and mounted are formed in the elastic member holder 130.

In a case in which the elastic member seating through-holes are formed in the elastic member holder 130, the elastic members 134 are fitted into the elastic member seating through-holes and supported by the button base 120, and in a case in which the elastic member seating grooves are formed in the elastic member holder 130, the elastic members 134 are fitted into the elastic member seating grooves and supported by bottom surfaces of the elastic member seating grooves. Upper ends of the through-base electric conductors 127 pass through the elastic member holder 130 and protrude upward past an upper end of the elastic member holder 130.

The push button fixing electric conductor 116, which is an electric conductor installed to be fixed to the lower side surface of the flange portion 113, may be a ring-shaped member having a hollow formed therein to be aligned with the hollow 121 of the button base 120.

The push button fixing electric conductor 116 may be formed of a metal material. When the push button 110 is pressed and moves downward, the push button fixing electric conductor 116 and the upper ends of the through-base electric conductors 127 come in direct contact, and when the pressing force is released, the push button 110 moves upward to its original position due to an elastic force of the plurality of elastic members 134, and the push button fixing electric conductor 116 and the plurality of through-base electric conductors 127 are spaced apart.

The double-sided adhesive tape 138 is a medium that adheres and fixes a lower side surface 123 of the button base 120 to a surface of the touchscreen panel 150. The double-sided adhesive tape 138 is cut into a substantially ring shape to correspond to the shape of the button base 120 and is disposed farther from an axis AX of the button device 100 that vertically crosses the center of the central portion 111, as compared to the plurality of through-base electric conductors 127.

Lower ends of the plurality of through-base electric conductors 127 come in contact with the surface of the touchscreen panel 150. The lower ends of the plurality of through-base electric conductors 127 may be level with the lower side surface 123 of the button base 120 or protrude downward past the lower side surface 123 to come in contact with the surface of the touchscreen panel 150.

When the central portion 111 of the push button 110 is pressed by a user's hand and the push button 110 moves downward in a state in which the button device 100 is attached to the surface of the touchscreen panel 150, the push button fixing electric conductor 116 installed at the lower side surface of the flange portion 113 of the push button 110 and the upper ends of the plurality of through-base electric conductors 127 come in direct contact.

Here, electrostatic energy resulting from capacitance of the push button fixing electric conductor 116 is transferred to the touch sensing film 155 of the touchscreen panel 150 through the plurality of through-base electric conductors 127. Accordingly, when the user presses the push button 110, a specific command intended by the user is input to an electronic device (not illustrated) in which the button apparatus 1 is installed. When the force pressing the push button 110 is released, the push button 110 moves upward to its original position due to the elastic force of the plurality of elastic members 134, and the push button fixing electric conductor 116 and the plurality of through-base electric conductors 127 are spaced apart.

The button lighting module 10 radiates light in a horizontal direction orthogonal to the axis AX of the button device 100 to illuminate a perimeter of the button device 100. In this way, the button lighting module 10 allows the button device 100 to glow or light to sequentially flicker therefrom upon an occurrence of a special event, such as when the push button 110 of the button device 100 is pressed or a specific screen is displayed on a display panel (not illustrated) installed in front of the electronic device, and thus increases visual stimulation for the user of the electronic device and viewers around the user.

The button lighting module 10 may include a light guide plate 11, a light source, a diffuser sheet 50, a lower reflector sheet 60, and an upper reflector sheet 70. The light guide plate 11 is a rectangular flat plate-shaped member having a predetermined thickness and has a button through-hole 12 formed therein to allow the button device 100 to pass therethrough. The button through-hole 12 has a circular shape that corresponds to a plan shape of the button device 100 and an inner diameter size ID1 that is greater than a diameter size BD of the button device 100.

The light guide plate 11 has four outer peripheral side surfaces 14, 15, 16, and 17 that restrict the rectangular flat plate shape. Among the four outer peripheral side surfaces 14, 15, 16, and 17, a first outer peripheral side surface 14 and a second outer peripheral side surface 15 are positioned opposite each other with the button through-hole 12 disposed therebetween, and a third outer peripheral side surface 16 and a fourth outer peripheral side surface 17 are positioned opposite each other with the button through-hole 12 disposed therebetween.

The light source radiates light, specifically, visible light, so that the light is incident on the light guide plate 11 through the outer peripheral side surfaces of the light guide plate 11, specifically, the first and second outer peripheral side surfaces 14 and 15. The light source may include a first light emitting diode (LED) assembly 30 including one group of a LED package 31 including a plurality of LEDs configured to radiate light to the first outer peripheral side surface 14 and a second LED assembly 40 including the other group of a LED package 41 including a plurality of LEDs configured to radiate light to the second outer peripheral side surface 15.

A plurality of LEDs configured to emit rays of light of different colors are packaged into a single group in each of the LED packages 31 and 41, and the amounts of light emitted from the plurality of LEDs included in the LED packages 31 and 41 may be adjusted to emit rays of light of various colors. The one group of the LED package 31 and the other group of the LED package 41 are disposed to face each other with the button through-hole 12 disposed therebetween.

The first LED assembly 30 may further include a first LED circuit board 34 configured to energizably support the one group of the LED package 31 and a first circuit board cover 38 configured to cover and protect an upper side surface of the first LED circuit board 34. The one group of the LED package 31 may be a side-surface light-emitting LED package that causes light to be projected from a side surface facing the first outer peripheral side surface 14.

The second LED assembly 40 may further include a second LED circuit board 44 configured to energizably support the other group of the LED package 41 and a second circuit board cover 48 configured to cover and protect an upper side surface of the second LED circuit board 44. The other group of the LED package 41 may be a side-surface light-emitting LED package that causes light to be projected from a side surface facing the second outer peripheral side surface 15.

The light guide plate 11 may have a light refractor 20 provided around the button through-hole 12 to refract upward a light path of light incident on the light guide plate 11 through the first outer peripheral side surface 14 and the second outer peripheral side surface 15.

The light refractor 20 may include a groove formed to be open toward a lower side surface 19 of the light guide plate 11 and be recessed in a thickness direction of the light guide plate 11. The light refractor 20 may extend along a closed curve path around the button through-hole 12. Specifically, the light refractor 20 may extend along a circular trajectory whose diameter size RE is greater than the inner diameter size ID1 of the button through-hole 12. However, the groove illustrated in FIGS. 3, 4, and 6 is only an example of the light refractor 20, and the light refractor provided in the light guide plate 11 is not limited thereto.

In the embodiment illustrated in the drawings, the button device 100 has a circular plan shape, and to correspond thereto, the button through-hole 12 and the light refractor 20 also have a circular plan shape. However, embodiments of the invention are not limited to the circular shape. For example, the button device may have a quadrangular or triangular plan shape, and to correspond thereto, the button through-hole and the light refractor may also have a quadrangular or triangular plan shape.

The diffuser sheet 50 is disposed on an upper side of the light guide plate 11 to overlap with the light refractor 20. The diffuser sheet 50 may be attached to an upper side surface 18 of the light guide plate 11. Since rays of light incident on the first outer peripheral side surface 14 and the second outer peripheral side surface 15 are refracted from the light refractor 20 toward the upper side of the light guide plate 11, a hot spot, that is, an area where light appears to be focused, is not prominently formed in light projected toward the upper side surface 18 of the light guide plate 11. However, the diffuser sheet 50 further diffuses light projected toward the upper side surface of the light guide plate 11 to completely eliminate the hot spot.

A button through-hole 52 is formed in the diffuser sheet 50 to allow the button device 100 to pass therethrough. The button through-hole 52 of the diffuser sheet 50 has a circular shape that corresponds to the plan shape of the button device 100 and an inner diameter size ID2 that is greater than the diameter size BD of the button device 100. The inner diameter size ID2 of the button through-hole 52 of the diffuser sheet 50 may be equal to the inner diameter size ID1 of the button through-hole 12 of the light guide plate 11.

The lower reflector sheet 60 is disposed on a lower side of the light guide plate 11 to overlap with the lower side surface 19 of the light guide plate 11. The lower reflector sheet 60 may be attached to the lower side surface 19 of the light guide plate 11. The lower reflector sheet 60 reflects light heading toward the lower side of the light guide plate 11 so that light that is incident on the first outer peripheral side surface 14 and the second outer peripheral side surface 15 and heads toward the lower side of the light guide plate 11 is not projected toward the lower side of the light guide plate 11.

A button through-hole 62 is formed in the lower reflector sheet 60 to allow the button device 100 to pass therethrough. The button through-hole 62 of the lower reflector sheet 60 has a circular shape that corresponds to the plan shape of the button device 100 and an inner diameter size ID3 that is greater than the diameter size BD of the button device 100. The inner diameter size ID3 of the button through-hole 62 of the lower reflector sheet 60 may be equal to the inner diameter size ID1 of the button through-hole 12 of the light guide plate 11.

The upper reflector sheet 70 is disposed on the upper side of the light guide plate 11 to overlap with the upper side surface 18 of the light guide plate 11. As illustrated in FIGS. 5 and 6, the upper reflector sheet 70 may be stacked on the diffuser sheet 50. In this case, one portion of the upper reflector sheet 70 may be attached to an upper side surface of the diffuser sheet 50, and the other portion of the upper reflector sheet 70 may be attached to the upper side surface 18 of the light guide plate 11.

Unlike in FIGS. 5 and 6, the upper reflector sheet 70 may be disposed between the light guide plate 11 and the diffuser sheet 50. In this case, the upper reflector sheet 70 may be attached to the upper side surface 18 of the light guide plate 11, and the diffuser sheet 50 may be attached to an upper side surface of the upper reflector sheet 70.

The upper reflector sheet 70 reflects light heading toward the upper side of the light guide plate 11 so that light that is incident on the first outer peripheral side surface 14 and the second outer peripheral side surface 15 and heads toward the upper side of the light guide plate 11 is not projected toward the upper side of the light guide plate 11. However, the upper reflector sheet 70 does not reflect light heading toward the upper side of the light guide plate 11 through the light refractor 20.

A light transmission through-hole 72 whose inner diameter size ID4 is greater than the diameter size RE of the light refractor 20 is formed in the upper reflector sheet 70 so that the upper reflector sheet 70 transmits, instead of reflecting, the light heading toward the upper side of the light guide plate 11 through the light refractor 20.

Due to the lower reflector sheet 60 and the upper reflector sheet 70, rays of light incident on the first and second outer peripheral side surfaces 14 and 15 of the light guide plate 11 are projected upward only through an area overlapping with the light refractor 20 among areas of the upper side surface 18 of the light guide plate 11 and are hardly projected through other areas of the upper side surface 18 of the light guide plate 11.

Accordingly, bright lighting may be implemented along the light refractor 20 around the button device 100 even when the number of LED packages 31 and 41 is reduced. In other words, the manufacturing cost of the button lighting module 10 can be reduced, and energy efficiency of the button lighting module 10 is improved.

Although not illustrated in the drawings, the button lighting module 10 may further include a reflector sheet attached to the third outer peripheral side surface 16 and the fourth outer peripheral side surface 17 of the light guide plate 11 to block light projected outward from an inner portion of the light guide plate 11 through the third outer peripheral side surface 16 and the fourth outer peripheral side surface 17. In this case, energy efficiency of the button lighting module 10 can be further improved.

The diffuser sheet 50, the lower reflector sheet 60, and the upper reflector sheet 70 may be installed to be attached to the light guide plate 11 as described above with reference to the drawings but may also be installed in other ways. For example, the lower reflector sheet 60 and the upper reflector sheet 70 may be connected by an adhesive tape while surrounding the light guide plate 11, and the diffuser sheet 50 may be fitted between the upper side surface 18 of the light guide plate 11 and the upper reflector sheet 70.

As illustrated in FIGS. 1 to 4, in the button apparatus 1, the touchscreen panel 150 is disposed on the lower side of the light guide plate 11, specifically, the lower side of the lower reflector sheet 60, and the button device 100 passes through the light guide plate 11, the diffuser sheet 50, the lower reflector sheet 60, and the upper reflector sheet 70 and is supported by a surface of the touchscreen panel 150 while in contact therewith.

An image displayed on the display panel 151 of the touchscreen panel 150 passes through the button through-hole 62 of the lower reflector sheet 60, the button through-hole 12 of the light guide plate 11, the button through-hole 52 of the diffuser sheet 50, and the light transmission through-hole 72 of the upper reflector sheet 70 and is exposed through the central portion 111 of the push button 110.

According to the button apparatus 1 described above, light is projected around the button device 100, and thus it is possible to enhance a visual effect of calling attention or adding brilliance.

The button lighting module 10 is configured so that light is incident on the first and second outer peripheral side surfaces 14 and 15 of the light guide plate 11, refracted around the button device 100, and projected upward, and thus it is easy to design the button lighting module 10 to have a small vertical height, and it is easy to design a button deck, in which the button device 100 and the button lighting module 10 are installed, to be slim and have a small height. Also, the formation of a hot spot which is a partial area noticeably brighter than other areas is suppressed around the button device 100, and thus fatigue of a user of the button device 100 and viewers around the user is reduced.

According to embodiments of the invention, since light is projected around a button device, a visual effect of calling attention or adding brilliance can be enhanced.

Since a button lighting module of embodiments of the invention is configured so that light is incident on an outer peripheral side surface of a light guide plate, refracted around a button device, and projected upward, it is easy to design the button lighting module to have a small vertical height, and it is easy to design a button deck, in which the button device and the button lighting module are installed, to be slim and have a small height. Also, since the formation of a hot spot which is a partial area noticeably brighter than other areas is suppressed around the button device, fatigue of a user of the button device and viewers around the user can be reduced.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A button lighting module comprising a light guide plate which has a button through-hole formed in a thickness direction to allow a button device configured to input a command to pass therethrough and has a light refractor provided around the button through-hole to refract a light path upward; and a light source which is configured to radiate light so that the light is incident on the light guide plate through an outer peripheral side surface of the light guide plate; wherein the light source includes: a plurality of light emitting diode (LED) packages configured to radiate light to the outer peripheral side surface of the light guide plate; and a LED circuit board configured to energizingly support the plurality of LED packages; wherein the plurality of LED packages comprise a first group of the LED packages and a second group of the LED packages not included in the first group, the first and second groups are disposed to face each other with the button through-hole disposed therebetween; and wherein the LED circuit board includes a first LED circuit board configured to support the first group of the LED package and a second LED circuit board configured to support the second group of the LED package; wherein each of the first and second groups are a side-surface light-emitting LED package that causes light to be projected from a side surface facing the outer peripheral side surface of the light guide plate; and wherein the first and second groups of LED packages are capable of being controlled independent of one another.

2. The button lighting module of claim 1, further comprising an upper reflector sheet disposed on the upper side of the light guide plate to overlap with an upper side surface of the light guide plate to reflect light heading toward the upper side of the light guide plate while not reflecting light heading toward the upper side of the light guide plate through the light refractor.

3. The button lighting module of claim 2, wherein a light transmission through-hole is formed in the upper reflector sheet, and an inner diameter of the light transmission through-hole is greater than a diameter of the light refractor.

4. The button lighting module of claim 1, further comprising a diffuser sheet disposed on an upper side of the light guide plate to overlap with the light refractor.

5. The button lighting module of claim 1, further comprising a lower reflector sheet disposed on a lower side of the light guide plate to overlap with a lower side surface of the light guide plate to reflect light heading toward the lower side of the light guide plate.

6. The button lighting module of claim 1, wherein the light refractor includes a groove formed to be open toward the lower side surface of the light guide plate and be recessed in the thickness direction of the light guide plate.

7. The button lighting module of claim 1, wherein the light refractor extends along a closed curve path around the button through-hole.

8. A button apparatus comprising a button lighting module including a light guide plate which has a button through-hole formed in a thickness direction and a light refractor provided around the button through-hole to refract a light path upward and a light source which is configured to radiate light so that the light is incident on the light guide plate through an outer peripheral side surface of the light guide plate; and a button device which has a push button configured to input a command upon being pressed and which is configured to pass through the button through-hole; wherein the light source includes a plurality of light emitting diode (LED) packages configured to radiate light to the outer peripheral side surface of the light guide plate; and a LED circuit board configured to energizingly support the plurality of LED packages; wherein the plurality of LED packages comprise a first group of the LED packages and a second group of the LED packages not included in the first group, the first and second groups are disposed to face each other with the button through-hole disposed therebetween; and wherein the LED circuit board includes a first LED circuit board configured to support the first group of the LED package and a second LED circuit board configured to support the second group of the LED package; wherein each of the first and second groups are aside-surface light-emitting LED package that causes light to be projected from a side surface facing the outer peripheral side surface of the light guide plate; and wherein the first and second groups of LED packages are capable of being controlled independent of one another.

9. The button apparatus of claim 8, further comprising a touchscreen panel disposed on a lower side of the light guide plate to support the button device while in contact therewith and electrically detect the push button being pressed.

10. The button apparatus of claim 9, wherein:
the push button has a central portion configured to transmit light; and
an image displayed on the touchscreen panel passes through the button through-hole and is exposed through the central portion.

\* \* \* \* \*